Oct. 24, 1944.　　　C. D. STEWART　　　2,361,134
FLUID PRESSURE BRAKE APPARATUS
Filed Dec. 30, 1942　　　2 Sheets-Sheet 1
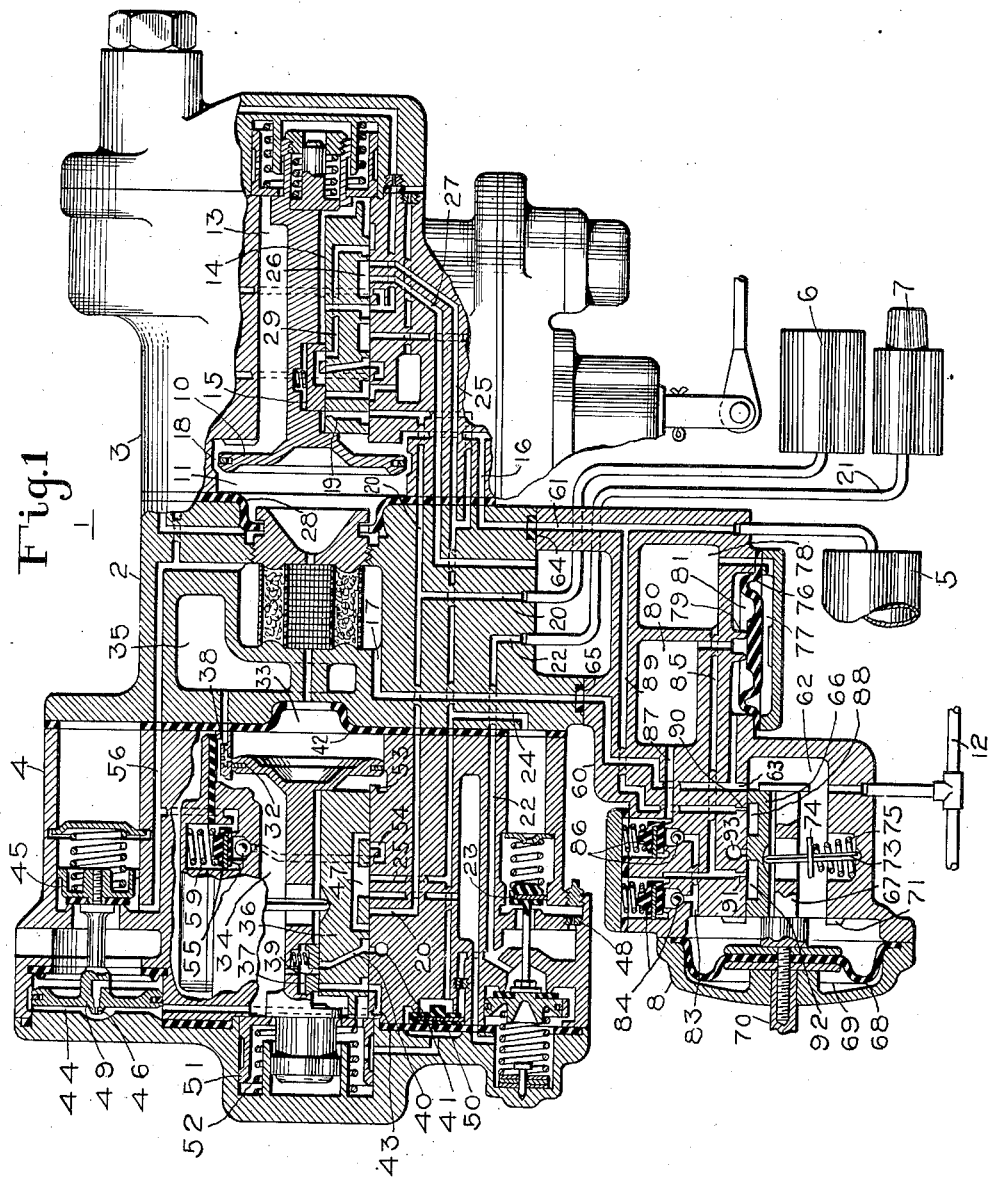
INVENTOR
Carlton D. Stewart
BY 
ATTORNEY Oct. 24, 1944.  C. D. STEWART  2,361,134
FLUID PRESSURE BRAKE APPARATUS
Filed Dec. 30, 1942  2 Sheets-Sheet 2
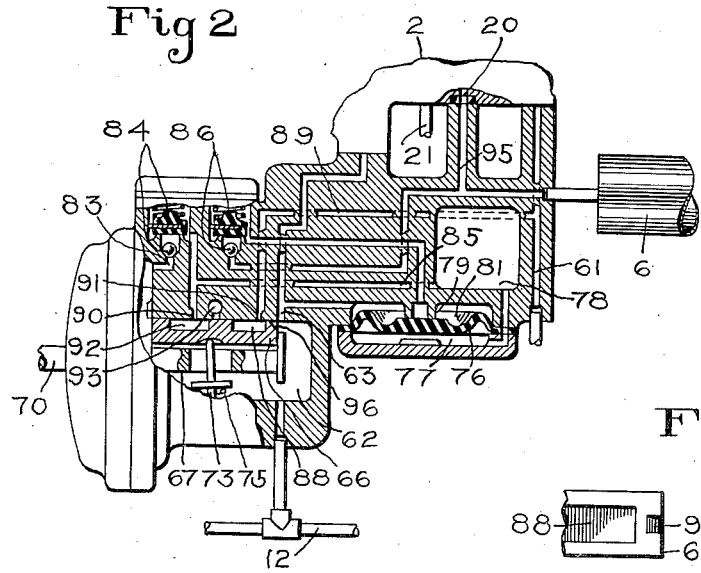
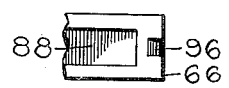
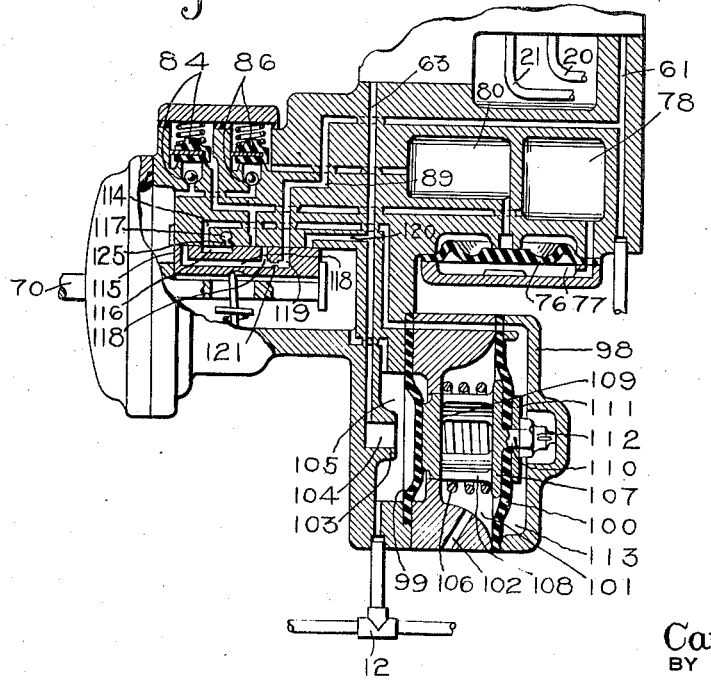
INVENTOR
Carlton D. Stewart
BY
ATTORNEY Patented Oct. 24, 1944

2,361,134

UNITED STATES PATENT OFFICE 2,361,134

FLUID PRESSURE BRAKE APPARATUS

Carlton D. Stewart, Wilkinsburg, Pa., assignor to The Westinghouse Air Brake Company, Wilmerding, Pa., a corporation of Pennsylvania Application December 30, 1942, Serial No. 470,675

23 Claims. (Cl. 303—68)

This invention relates to fluid pressure apparatus of the automatic type and more particularly to means for causing operation of said apparatus to effect a release of brakes.

When a car equipped with automatic brakes and having its reservoir or reservoirs charged with fluid under pressure is cut out of a train and the brake pipe on the car is vented, the triple valve or the like moves to emergency position in which communication is opened between the reservoir or reservoirs and the brake cylinder device. The pressure of fluid in the reservoir or reservoirs then equalizes into the brake cylinder device and effects an emergency application of the brakes on the car. To release the brake application so that the car may then be moved, it has been customary for a trainman to operate the reservoir release valve or valves to completely dissipate the fluid pressure from the usual reservoir or reservoirs and thereby from the connected brake cylinder device. This operation not only wastes the stored fluid pressure in the reservoirs but also requires time on the part of the trainman, since he must hold the reservoir release valve or valves open until the brakes are released. When the car is subsequently placed in a train, it is then necessary to completely recharge the reservoir or reservoirs either by a local yard charging plant or by a coupled locomotive before the train may be moved. This requires a relatively long period of time and consequent excessive use and wear of apparatus to accomplish same, all of which is undesirable.

It is therefore apparent that it is desirable to release the brakes on a car, when the car is cut out of a train, without dissipating the stored fluid pressure in the reservoir or reservoirs, and one object of the invention is the provision of novel brake release means for accomplishing this result.

According to this object, I provide a brake release means which, though not limited in use to any specific triple valve or the like, is particularly arranged for attachment to the bracket of the well known "AB" valve. This brake release means is arranged to control communication between the brake pipe on the car and the "AB" valve and is operable manually to a brake release position for closing said communication and for supplying fluid under pressure to the brake pipe passage in the "AB" valve for effecting automatically the usual brake release operation of said valve. This release operation disconnects the storage reservoirs from the brake cylinder device and opens the brake cylinder device to atmosphere, thereby effecting a release of brakes on the car without loss of the stored fluid pressure in the reservoirs. The brake release means may remain in the brake release position to which it is moved manually until the brake pipe on the car is recharged, as after the car is again cut into a train, at which time the pressure of fluid supplied to the brake pipe will automatically reset or actuate the release means from its brake release position back to a normal position to reconnect the "AB" valve to the brake pipe, so that said valve may then be controlled from the brake pipe, in the usual manner.

Other objects and advantages will be apparent from the following more detailed description of the invention:

In the accompanying drawings; Fig. 1 is diagrammatic view of an "AB" brake equipment having associated therewith one form of brake release means embodying the invention; Fig. 2 is a view similar to a portion of the structure shown in Fig. 1 and embodying a modified form of the invention; Fig. 3 is a plan view of one end of the seating face of a slide valve shown in Fig. 2; and Fig. 4 is a view similar to Fig. 2, but embodying another form of the invention.

*Description—Figure 1*

As shown in the drawings, the brake equipment comprises an "AB" valve 1 embodying a pipe bracket 2, a service application valve device 3 mounted on one face of said bracket, an emergency application valve device 4 mounted on another face of said bracket, and other parts which, while shown in elevation, do not enter into the invention and will not therefore be described. The brake equipment further comprises the usual auxiliary reservoir 5, emergency reservoir 6, brake cylinder device 7 and, according to the invention, a brake releasing device 8 arranged for attachment to the pipe bracket 2.

The service application valve device 3 comprises a piston 10 having at one side a brake pipe chamber 11 which is normally in communication with a brake pipe 12 by way of a passage 17 and through the brake releasing device 8, as will be hereinafter described. At the opposite side of piston 10 is a valve chamber 13 in constant communication with the auxiliary reservoir 5 by way of a passage 16. The valve chamber 13 contains a main slide valve 14 and an auxiliary slide valve 15 arranged for control by the piston 10 in the usual manner.

When the brake pipe 12 and piston chamber 11 are charged with fluid under pressure and piston 10 is in its brake release position shown, fluid will flow from said chamber through a feed groove 18 around said piston to valve chamber 13 and thence through passage 16 to the auxiliary reservoir 5 to charge same to the same pressure as that in the brake pipe. In the release position of piston 10 and slide valves 14 and 15 fluid under pressure will flow from valve chamber 13 through a port 19 in the main slide valve to a passage 20 and thence to the emergency reservoir 6 for charging said reservoir to brake pipe pressure. Also in the release position of the main slide valve 14 the brake cylinder 7 is open to the atmosphere through a pipe 21, a passage 22, past a check valve 23 in the emergency valve device 4, and thence through passages 24 and 25, a cavity 26 in said slide valve and a release passage 27.

Upon a reduction in pressure in brake pipe 12 and thus in piston chamber 11 at either a service or an emergency rate, the piston 10 is adapted to move into contact with a gasket 28. During such movement the piston first shifts the auxiliary slide valve 15 relative to the main slide valve 14 to a position lapping port 19 and opening a service port 29 to the valve chamber 13, and then shifts both slide valves in unison to a position in which the service port 29 registers with passage 25. Fluid under pressure then flows from the auxiliary reservoir 5 to the brake cylinder device 7 and actuates same to apply the brakes.

Upon a subsequent increase in brake pipe pressure for effecting a release of brakes, the piston 10 and slide valves are returned to their normal positions shown in which the auxiliary reservoir 5 is supplied with fluid from the brake pipe by way of feed groove 18 and from the emergency reservoir 6 by way of port 19. After substantial equalization of the pressures in both the auxiliary and emergency reservoirs, said reservoirs then both charge to the normal pressure in the brake pipe as before described.

Also in this position of the main slide valve 14 the brake cylinder device 7 is disconnected from the auxiliary reservoir 5 and opened to the atmosphere for releasing the brakes.

The emergency valve device 4 comprises an emergency piston 32 having at one side a chamber 33 which is normally open to the brake pipe by way of passage 17 and the brake release device 8, and having, at the opposite side, a valve chamber 34 open to a quick action chamber 35. The valve chamber 34 contains a main slide valve 36 and an auxiliary slide valve 37 mounted on the main slide valve, the two slide valves being connected for movement by the piston 3 in the usual manner.

When the brake pipe 12 and thereby the emergency piston chamber 33 are charged with fluid under pressure, the emergency piston 32 and slide valves 36 and 37 will occupy their normal position shown, in which a feed port 38 is open to piston chamber 33 for supplying fluid under pressure from the brake pipe to valve chamber 34 and quick action chamber 35 to charge same with fluid at the same pressure as in the brake pipe.

Upon a service reduction in pressure in piston chamber 33, the emergency piston and thereby the auxiliary slide valve 37 will move in the direction of said chamber to a position in which a port 39 in the auxiliary slide valve registers with a port 40 in the main slide valve, and through these ports fluid will then flow from the valve chamber and quick action chamber 35 to a passage 41 and thence to the atmosphere. This release of fluid under pressure from the valve chamber 34 and quick action chamber 35 will reduce the pressure in said chambers at the same rate as the brake pipe pressure acting on the opposite side of the piston 32 reduces upon a service rate of reduction in brake pipe pressure, so as to thereby stop movement of the piston 32 in the service position.

The venting capacity of ports 39 and 40 however is insufficient to reduce the pressure of fluid in valve chamber 34 as fast as the brake pipe pressure in piston chamber 33 reduces upon an emergency rate of reduction in brake pipe pressure, so that upon such a reduction a differential is obtained between the pressures in piston chamber 33 and valve chamber 34 on the piston 32 of such a degree as to cause said piston to move to an emergency position into engagement with a gasket 42. This movement of the emergency piston will shift the main slide valve 35 to an emergency position in which a passage 43 is opened to valve chamber 34. Fluid under pressure will then flow from valve chamber 34 and quick action chamber 35 to passage 43 and thence to a chamber 44 for actuating a piston 49 to unseat a brake pipe vent valve 45 past which a sudden local venting of fluid under pressure from the brake pipe 12 then occurs. The fluid pressure in valve chamber 34 and quick action chamber 35 will then be gradually dissipated through a port 46 in piston 49 to permit closure of the vent valve 45 after a certain lapse of time.

In emergency position of the main slide valve 34 a cavity 47 therein connects the emergency reservoir passage 20 to passage 25 which upon an emergency reduction in brake pipe pressure is supplied with fluid under pressure from the auxiliary reservoir 5 by operation of the service application valve device 3 as hereinbefore described. Fluid under pressure from both the auxiliary and emergency reservoirs will thus be supplied to passage 25 upon an emergency reduction in brake pipe pressure and such fluid will initially flow past the check valve 23 to the brake cylinder device 7. The check valve 23 is arranged to close upon a certain increase in brake cylinder pressure following which further flow of fluid to the brake cylinder device will occur through a choke 48 and finally by way of a timing valve check valve 50 which opens, also as well known, to thereby effect an emergency application of the brakes.

This specific control of the flow of fluid from the two reservoirs to the brake cylinder device is immaterial to the invention and a further description thereof is not deemed essential, since it is merely desired to bring out that upon an emergency reduction in brake pipe pressure, the auxiliary reservoir 5 is placed in communication with the brake cylinder device 8 by operation of the service application valve device 3, and the emergency reservoir 6 is placed in communication with the brake cylinder device by operation of the emergency valve device 4, and the fluid pressures in both of said reservoirs is therefore permitted to equalize into the brake cylinder device to effect the emergency application of brakes.

It is also desired to bring out that after an emergency application of brakes is completed, the brake pipe 12, emergency valve chamber 34, and quick action chamber 35 will be at atmospheric pressure so that the emergency slide valve 36 will remain in its emergency position. The parts of the service application valve device will also remain in their application position with the brake pipe completely vented since the service piston is subject at this time in valve chamber 13 to the pressure of fluid in the auxiliary reservoir 5 which will be equalized with that in the emergency reservoir into the brake cylinder device 7 at a value such as sixty pounds, assuming the brake pipe pressure preceding the emergency reduction was seventy pounds. Thus at the termination of an emergency application of brakes the service piston 10 will be held in emergency position by auxiliary reservoir pressure, while the emergency piston 32 will be subject on opposite sides to substantially atmospheric pressure.

In order to release an emergency application of the brakes, fluid under pressure will be supplied to the brake pipe 12 and thence to piston chambers 11 and 33 for increasing the pressure of fluid on the service and emergency pistons 10 and 32. Upon a slight increase in pressure in chamber 33 on the emergency piston 32 said piston will move out of its emergency position and back to its normal position defined by contact with a plunger 51 which is subject to the pressure of a spring 52. This movement of the piston 32 will shift the main slide valve 36 back to its normal position in which passage 20 from the emergency reservoir 6 is lapped, thereby closing communication between said reservoir and passage 25 which at this time is still open to the brake cylinder device 7 and to the auxiliary reservoir 5 by way of the service application valve device 3.

Also in this normal position of the emergency piston 32, the port 38 is open to chamber 33 so that fluid will then flow from the brake pipe to valve chamber 34 and the quick action chamber 35 for charging same. The rate of increase in brake pipe pressure for releasing brakes sufficiently exceeds the rate of charging of the valve chamber 34 by way of feed port 38, however, as to provide a faster increase in pressure in piston chamber 33 than occurs in valve chamber 34 so that by the time the brake pipe pressure acting in chamber 33 is increased to a relatively low degree such as ten pounds, a sufficient differential in pressure will be provided on piston 32 to overcome the pressure of spring 52 and move the piston 32 past its normal position to a back-dump position defined by contact between said piston and a stop 53 in the casing.

In this back-dump position of the main slide valve 36, the cavity 47 opens communication between passage 25 and a passage 54 and fluid under pressure from the brake cylinder device 7 and connected auxiliary reservoir 5 will then flow to passage 54 and thence past two serially arranged check valves 55 to passage 56 which is open to the brake pipe 12. Since the emergency brake applying pressure in the brake cylinder device and auxiliary reservoir may be around sixty pounds, as hereinbefore mentioned and the pressure of fluid in the brake pipe 12 may be at a relatively low degree, such as ten pounds at the time the emergency valve device moves to back-dump position, the fluid from the brake cylinder device 7 and connected auxiliary reservoir supplied to the brake pipe will therefore cause a local rapid increase therein to a degree such as forty-five pounds for hastening the recharging of the brake pipe 12 and thus the release of brakes following an emergency application. Upon substantial equalization of the pressures of fluid in the brake cylinder device 7 and auxiliary reservoir 5 into the brake pipe 12, the upper check valve 55 will seat under the action of a spring 59 to prevent back flow of fluid from the brake pipe upon a further normal increase in brake pipe pressure back to its normal value. During this further increase in brake pipe pressure the valve chamber 34 and quick action chamber 35 will become charged to the same pressure as in the brake pipe by way of feed port 38 and upon substantial equalization of these pressures spring 52 acting on plunger 51 will return the emergency piston 32 and the slide valves 36 and 37 to their normal positions for functioning upon a subsequent reduction in brake pipe pressure.

When the brake pipe pressure effective in chamber 11 of the service application valve device 3 is increased to a degree slightly exceeding the reduced auxiliary reservoir pressure in valve chamber 13, said piston will operate to return the slide valves 14 and 15 to their normal release positions shown in which communication is closed between the brake cylinder device 7 and auxiliary reservoir 5 and said reservoir is recharged with fluid under pressure from the brake pipe, and the brake cylinder device is opened to atmosphere for releasing the brakes. Also in this position of the service application valve device the emergency reservoir 6 is again opened to valve chamber 13 so as to become recharged with fluid at the pressure in the brake pipe.

Briefly summarizing the operations above described for a clear understanding of the operation of the reservoir release device 8 which follows, it will be noted that upon an emergency reduction in brake pipe pressure from a normal degree such as seventy pounds, both the auxiliary reservoir 5 and emergency reservoir 6 are opened to the brake cylinder device 7 and the pressure of fluid in said reservoirs equalized into said brake cylinder device at a degree such as substantially sixty pounds. Upon a subsequent increase in brake pipe pressure to effect a release of the emergency brake application, the emergency valve device 4 is moved to back-dump position upon a relatively small increase in brake pipe pressure to disconnect the emergency reservoir from the brake cylinder device 7, thereby bottling in the emergency reservoir fluid at substantially the sixty pounds pressure. In this back-dump position the brake cylinder device 7 and auxiliary reservoir 5 are connected to the brake pipe 12 on the car which results in a reduction in pressures in said reservoir and brake cylinder device to a degree such as forty-five pounds resulting in a substantial corresponding increase in brake pipe pressure. When the brake pipe pressure is then increased above this latter pressure effective in the auxiliary reservoir, the service piston 10 and slide valves 14 and 15 are returned to their normal positions shown in which communication is closed between the auxiliary reservoir and the brake cylinder device, and said reservoir is recharged with fluid under pressure from the brake pipe, and the brake cylinder device is opened to the atmosphere for releasing the brakes. Also, with the parts of the service application valve device 3 returned to their normal position communication is open between the auxiliary reservoir and the emergency reservoir to allow charging of the latter to the brake pipe pressure.

A more complete description of the "AB" valve is not essential to an understanding of the invention, which will now be described.

*Description—brake release device 8—Fig. 1*

The brake release device 8 comprises a casing 60 which, according to the invention, is preferably mounted on the pipe bracket 2 over the passages 16 and 17, heretofore connected respectively directly to the brake pipe 12 and auxiliary reservoir 5. According to the invention the auxiliary reservoir 5 is connected to the casing 60 which is provided with a passage 61 which connects said reservoir to passage 16 in the pipe bracket 2 while the brake pipe 12 is connected to a slide valve chamber 62 in said casing. The brake pipe passage 17 in the pipe bracket 2 is connected to a passage 63 in the casing which leads to valve chamber 62. Suitable gaskets 64 and 65 are provided between the casing 60 and pipe bracket in the connections just described for preventing leakage of fluid under pressure.

The valve chamber 62 contains a slide valve 66 arranged to control communication between passage 63 and chamber 62 which is constantly open to the brake pipe 12. The slide valve is mounted between two spaced shoulders on a stem 67 which is connected to one side of a flexible diaphragm 68 clamped around its periphery in the casing. Connected to the opposite side of the diaphragm is a push rod 70 mounted to slide in a suitable bore through the casing and this side of the diaphragm is constantly subject to atmospheric pressure in a chamber 69 as by way of slight clearance space (not shown) between said rod and the wall of said bore.

This push rod 70 is provided for manual operation to deflect the diaphragm 68 and move the slide valve 66 from a normal position shown in the drawings in the direction of the right-hand to a brake release position defined by contact with shoulders 71 in the casing, and to this end may be connected by any conventional means (not shown) to opposite sides of a car for operation by a trainman.

A rockable push rod 73 having one end in contact with the casing within a recess freely extends through a suitable slot in the diaphragm stem 67 and into a recess in slide valve 66 wherein it has rocking engagement with said valve. This stem is provided with a collar 74 between which and the casing is interposed a spring 75 under pressure, said spring acting on the slide valve 66 to hold same seated at all times.

The casing 60 also contains a flexible diaphragm 76 clamped around its periphery and which has at one side a chamber 77 connected to a timing reservoir 78. At the opposite side of diaphragm 76 the casing has an annular seat rib 79 arranged for sealing engagement with the diaphragm, the space within said rib being in constant communication with a release reservoir 80, while an annular space 81 encircling said rib is open to the brake pipe passage 63.

When the brake pipe 12 is charged with fluid under pressure, such pressure effective in valve chamber 62 on the right-hand face of the diaphragm 68 is operative to deflect said diaphragm and move the slide valve 66 to the normal position shown in which position these parts will remain unless manually moved by push rod 70 as will be later described.

In this normal position of slide valve 66 passage 63 is open to valve chamber 62 thus connecting brake pipe 12 to passage 17 in the "AB" valve so that said valve may operate in response to variations in pressure in the brake pipe in the usual manner, as above described.

When the brake pipe 12 is charged with fluid under pressure fluid flows from valve chamber 62 through a passage 83, past two serially arranged check valves 84 and thence through a passage 85 to the timing reservoir 78 and to chamber 77 below the diaphragm 76, and at the same time fluid flows from passage 83 past two serially arranged check valves 86 to a passage 87 and thence to the release reservoir 80, thereby providing for charging of both of said reservoirs and the chamber 77 with fluid at the pressure normally carried in the brake pipe, said check valves acting to prevent back flow of this fluid to the brake pipe when the pressure of fluid in the brake pipe and slide valve chamber 62 is reduced for controlling operation of the "AB" valve.

With the slide valve 66 of the release valve device in its normal position shown and the diaphragm chamber 81 thus open to the brake pipe, it will be seen that when the brake pipe is fully charged with fluid under pressure the opposing fluid pressure on the diaphragm 76 will be substantially equal to permit said diaphragm to seat against the rib 79. However upon a reduction in brake pipe pressure for causing operation of the "AB" valve in the usual manner, such reduction in pressure will also be effective in chamber 81 under which condition the timing reservoir pressure in chamber 77 acting on the opposite side of the diaphragm will hold said diaphragm in sealing contact with the seat rib 79 and thus cooperate with the check valve 86 to bottle the fluid pressure in the release volume 80, during normal operation of the "AB" valve.

If a car provided with the brake release device 8 is cut out of a train and the brake pipe 12 is vented, the "AB" valve 1 will operate to cause an emergency application of brakes in the same manner as above described, it being noted that the piston chambers 11 and 33 will both be opened to the atmosphere past the slide valve 66 and thence through valve chamber 62 and brake pipe 12.

With the brakes on the car thus applied in emergency and the brake pipe 12 and thereby piston chambers 11 and 33 open to the atmosphere, let it be assumed that it is desired to release the fluid under pressure from the brake cylinder device 7 for releasing the car brakes, without recharging the brake pipe 12 and without losing the stored fluid pressure in the auxiliary and emergency reservoirs 5 and 6, respectively.

To accomplish this end a trainman from the side of the car will push the plunger 70 inwardly and thereby deflect the diaphragm 68 from its normal position shown into contact with the shoulders 71. This movement of the diaphragm will shift the slide valve 66 to a position in which communication is closed between passage 63 and brake pipe 12 and said passage is connected through a cavity 88 in said slide valve to a passage 89 which is connected to the auxiliary reservoir passage 61, a choke 90 being provided in the passage 89. Through this communication fluid under pressure will then flow from the auxiliary reservoir 5 and thereby from the connected emergency reservoir 6 and brake cylinder device 7 to the service and emergency piston chambers 11 and 33. When a slight increase in pressure, is thus provided in chamber 33 on one side of the emergency piston 32, the opposite side of which is at this time subject to atmospheric pressure, said piston will move to the position shown in the drawings in which communication is closed between the emergency reservoir 6, and the auxiliary reservoir 5 and brake cylinder device 7, and also in which the feed port 38 is opened to piston chamber 33 to permit flow of fluid from said chamber to valve chamber 34 and the quick action chamber 35. The choke 90 has a flow capacity exceeding that of the feed port 38, so as to thereby provide a more rapid increase in pressure in piston chamber 33 from the auxiliary reservoir and brake cylinder device than is obtained in chamber 34. As a result, a differential in pressures will be created on the emergency piston 32 and when this differential is increased to a degree, such as ten pounds, said piston will move the plunger 51 against spring 52 to position the slide valve 36 in the back-dump position above described. Fluid under pressure will then flow from the auxiliary reservoir 6 and brake cylinder device 7 through cavity 47 in the slide valve 36 and thence past the check valves 55 to passage 56 and into the piston chambers 11 and 33, thereby providing a relatively rapid increase in pressure in said chambers to a degree such as fifty-five pounds, and at the same time a reduction in pressure in the auxiliary reservoir 6 and brake cylinder device 7 to substantially the same degree. This increase in pressure in piston chambers 11 and 33 is greater than in the usual back-dump operation of the "AB" valve due to the brake pipe 12 in the car being disconnected at this time from said chambers.

After this back-dump operation fluid pressure continues to flow from the emergency piston chamber 33 through feed port 38 to valve chamber 34 and quick action chamber 35 for charging same and when the opposing pressures on the emergency piston 32 become substantially equal, the pressure of spring 52 on plunger 51 will return the piston 32 to the position shown in the drawings. It will be noted that during this time the service piston 10 remains in its application position in contact with gasket 28 since the auxiliary reservoir pressure effective in valve chamber 13 is at least equal to the opposing pressure in chamber 11 obtained from the auxiliary reservoir and brake cylinder device.

When the slide valve 66 is urged to its right-hand position manually as above described, the timing reservoir 78 is connected by way of passage 85 containing a choke 91 and a cavity 92 in the slide valve to an atmospheric vent passage 93 so that the pressure in said reservoir and in chamber 77 below the diaphragm 76 will gradually reduce. The opposite side of the diaphragm 76 is at this time subject within the annular seat rib 79 to the pressure of fluid in the release reservoir 80 and in chamber 81 outside of said rib to the increase in pressure in piston chambers 11 and 33. The capacity of choke 91 is so related to the volume of the timing reservoir 78 as to provide such a reduction in pressure in chamber 77 below the diaphragm 76 as to allow the opposing fluid pressures on said diaphragm to move same out of contact with the seat rib 79 at substantially the time the emergency valve chamber 34 and quick action chamber 35 become charged through the feed port 38 to substantial equalization with the opposing pressure of fluid on the emergency piston in chamber 33. At substantially the time this condition is attained, the fluid pressures acting above the diaphragm 76 will deflect same out of contact with seat rib 79 whereupon fluid at the normal pressure carried in the brake pipe 12 and heretofore bottled in the release reservoir 80 will flow therefrom past the diaphragm to chamber 81 and thence through passages 63 and 17 into chambers 11 and 33. The resulting increase in pressure in chamber 33 on the emergency piston 32 is immaterial, but the release reservoir 80 is of such volume that said increase in pressure in chamber 11 on the service piston 10 is of a degree sufficiently in excess of the auxiliary reservoir pressure acting in valve chamber 13 at the opposite side of the piston 10 as to move said piston and the slide valves 14 and 15 back to their release positions shown for thereby disconnecting the auxiliary reservoir 5 from the brake cylinder device 7 and for opening said brake cylinder device to the atmosphere. Both the auxiliary and emergency reservoirs are thereby disconnected from the brake cylinder device and said device opened to the atmosphere, thus providing for a release of brakes on the car without losing the stored fluid pressure in said reservoirs, as desired.

When the slide valve 14 is returned to its normal position shown, port 19 is opened by the auxiliary slide valve 15 to the valve chamber 13 and registers with passage 20 which is connected to the emergency reservoir 6. The emergency reservoir was disconnected from the brake cylinder device and auxiliary reservoir when the pressure therein was about sixty pounds. As a result, when the emergency reservoir is connected to valve chamber 13 which at this time will be charged to a pressure such as fifty-five pounds, there will be a flow of fluid under pressure from the emergency reservoir to the valve chamber 13 and thus to the auxiliary reservoir which will increase the pressure therein to above the fifty-five pounds hereinbefore mentioned. The size of the release reservoir 80 is such however as to provide an increase in pressure in chamber 11 on piston 10 to a degree sufficient to maintain said piston and the slide valves 15 and 14 in their release position against the increase in pressure in valve chamber 13 from the emergency reservoir.

It will thus be seen that with the brake pipe 12 vented as when the car is cut out of a train, operation of the release valve device 8 by a trainman from the side of a car will isolate the piston chambers 11 and 33 from the brake pipe and then provide fluid pressure in said chambers of such a degree as to effect usual operation of the "AB" valve to disconnect the auxiliary and emergency reservoirs from the brake cylinder device and to release fluid under pressure from the brake cylinder device, without losing the stored fluid pressure in said reservoirs.

As above mentioned, the choke 90 is of such size as to provide an increase in pressure in the emergency piston chamber 33 by flow from the auxiliary reservoir 5 somewhat in excess of the capacity of feed port 38 to charge the valve chamber 34 and quick action chamber 35 in order to obtain a sufficient differential in pressures on the emergency piston to cause normal back-dump operation thereof to provide the sudden increase in pressure in piston chambers 11 and 33 by flow of fluid under pressure from the auxiliary reservoir and brake cylinder device. This choke also acts when the timing valve diaphragm 76 moves out of engagement with seat rib 89 to limit dissipation of fluid pressure from the release reservoir 80 to the auxiliary reservoir, since as will be readily seen, when fluid is supplied from the release reservoir to the piston chambers 11 and 33 it may at the same time flow by way of choke 90 to the auxiliary reservoir. By thus limiting such dissipation of fluid from the release reservoir said reservoir may be of smaller volume than otherwise would be required to provide the necessary differential on the service piston 10 to move it to its brake release position as above described. A larger release reservoir 80 might however be employed to accomplish the same release operation of piston 10 without using the choke 90, if such were desired.

As before mentioned, the choke 91 is provided to delay movement of diaphragm 76 away from the seat rib 79 until the pressure of fluid in valve chamber 34 and quick action chamber 35 becomes substantially equal to that in piston chamber 33 as attained from the brake cylinder device 7 and auxiliary reservoir 5. The purpose of this delay is to minimize the amount of fluid pressure required in piston chamber 11 for moving the service piston 10 and slide valves 14 and 15 to and then holding same in their release position and for at the same time charging of the valve chamber 34 and quick action chamber 35 to the pressure in the piston chambers. Due to this the release reservoir 80 may be of a minimum size as will be apparent.

When the car is subsequently cut into a train and the brake pipe 12 is again charged with fluid under pressure, the pressure in valve chamber 62 will increase with that in the brake pipe and when this pressure acting on diaphragm 68 is built up to a degree sufficient to overcome the resistance to movement of slide valve 66, the diaphragm 68 and thereby said slide valve will be returned to their normal positions shown in which the piston chambers 11 and 33 are reconnected to the brake pipe 12 so that the "AB" valve may again operate in response to variations in pressure in the brake pipe in the usual manner above described. Fluid at the pressure supplied from the brake pipe 12 to valve chamber 62 also flows past the check valves 84 to the timing reservoir 78 and chamber 77 below diaphragm 76, and past the check valves 86 to the release reservoir 89 to thereby recharge said reservoirs and chamber to the pressure in the brake pipe.

The parts of the release valve device 8 will remain in the normal condition shown upon movement thereto by pressure of fluid from the brake pipe 12 even upon opening the brake pipe 12 to atmosphere as in effecting an emergency application of brakes. Movement of diaphragm 68 and slide valve 66 out of their normal position to their brake release position defined by contact with shoulder 71 must be effected manually by rod 70 and the parts will then remain in this brake release position until subsequent recharging of the brake pipe 12 and valve chamber 62 after the car is again cut into a train.

When the car is cut into the train and the piston chambers 11 and 33 are reconnected to the brake pipe 12 past slide valve 66, the air required from the brake pipe 12 for recharging the brake equipment is limited to that needed to increase the pressure of fluid in the auxiliary and emergency reservoirs from the degree retained therein by manual operation of the release valve device 8, back to the normal degree carried in the brake pipe, thus requiring less fluid pressure and less time for recharging the brake system than is ordinarily required where the two reservoirs are completely vented for obtaining a release of brakes on a car cut out of a train.

When the brake pipe 12 is recharged to effect movement of diaphragm 68 and slide valve 66 to their normal positions shown, it is desirable that such movement be delayed until the brake pipe pressure is increased to a degree such as fifty-five pounds which will prevent such a reduction in pressure in the emergency piston chamber 33 into the brake pipe 12 as to result in undesired emergency operation of the emergency valve device 4 and thus of the service application valve device to reconnect the two reservoirs to the brake cylinders. This delay may be attained by providing spring 75 with such force as to hold the slide valve 66 against movement from its brake release position until the brake pipe pressure is increased to the desired pressure, above mentioned.

*Description—Figure 2*

If desired, a release valve device such as shown in Fig. 2 may be employed in place of that shown in Fig. 1 to accomplish the same results. This device differs from that shown in Fig. 1 in that the release reservoir 80 is dispensed with and the casing of the device is provided with a passage 95 arranged for connection with the emergency reservoir passage 20 in the pipe bracket 2; the emergency reservoir being connected to passage 95 in said casing. The passage 95 leads to the seat side of the two check valves 86 which in this embodiment are disconnected from passage 88.

With this arrangement fluid at the pressure bottled in the emergency reservoir 6 upon movement of the emergency valve piston 32 and slide valves 36 and 37 to their back-dump position and which pressure is in excess of that in the auxiliary reservoir 5 and brake cylinder 7 and thus in piston chambers 11 and 33 at the end of said back-dump operation, is provided for supply to said chambers upon movement of the timing valve diaphragm 76 out of engagement with the seat rib 79. This supply of fluid from the emergency reservoir will effect an increase in pressure in chamber 11 on the service application piston 10 which will move same to its release position for disconnecting the brake cylinder device 7 from the auxiliary reservoir 5 and to connect said brake cylinder device to atmosphere.

In this structure the choke 90 functions as in the structure shown in Fig. 1 to delay movement of the diaphragm 76 away from the seat rib 79 until after back-dump operation of the emergency valve device, but this delay need not be so great as to allow charging of the emergency valve chamber 34 and quick action chamber 35 with fluid at substantially the same pressure as acting in the piston chambers 11 and 33 as in the structure shown in Fig. 1 since the relatively large volume of the emergency reservoir will provide for such charging after providing the differential on the service piston 10 to move it to its release position.

The choke 91 functions in this structure the same as the structure shown in Fig. 1 to allow the pressure in the emergency piston chamber 33 to increase slightly faster than the opposing pressure on the emergency piston by way of port 38 in order to ensure back-dump operation of the emergency valve device.

In this structure the slide valve 66 is provided in its right-hand end with a small slot 96, for gradually opening what may be called a secondary communication between the brake pipe chamber 62 and passage 63 ahead of said passage being uncovered by the end of the slide valve 66, opening what may be called a main or primary communication, upon movement of diaphragm 68 and the slide valve 66 back to their normal positions upon recharging of the brake pipe 12. The purpose of this groove is thus to allow pressure of fluid in piston chambers 11 and 33 to start gradually reducing in to the valve chamber 62 and brake pipe 12 ahead of full opening being established past the end of the slide valve between passage 63 and the brake pipe 12. Upon this gradual reduction in pressure in piston chamber 33, the emergency piston 32 will move to service position and cause a corresponding rate of reduction in pressure in valve chamber 34 and thus prevent undesired movement of said piston to emergency position in which an undesired emergency application of brakes would occur. With this groove 96 provided in the slide valve 66 the release valve device 8 may be allowed to return to its normal position upon any desired increase in pressure in the brake pipe 12 without causing undesired emergency operation of emergency valve device 4. In case the release valve device 8 is thus returned to normal position when the pressure in the brake pipe is at a relatively low degree the service application valve device may however operate to connect the auxiliary reservoir to the brake cylinder device 7 and effect a greater or less degree of service application of brakes but there will be no flow or loss of fluid pressure from the emergency reservoir. Under this condition there will thus be some loss of fluid pressure from the auxiliary reservoir, which is not desired but which is nevertheless relatively small due to the relatively small volume of said reservoir as compared to that of the emergency reservoir. In order to prevent any loss of fluid pressure from the auxiliary reservoir upon operation of the release valve device 8, in response to an increase in brake pipe pressure, such operation may however be delayed by a suitable force of spring 75 as in the structure shown in Fig. 1 and above described.

*Description—Figure 4*

The communication between the service and emergency piston chambers 11 and 33 in the "AB" valve and the brake pipe 12 is relatively large and therefore in a structure such as shown in Figs. 1 and 2 the slide valve 66 must be correspondingly large to control said communication. If desired a slide valve 115 smaller than the slide valve 66 may be employed by using a structure such as shown in Fig. 4 wherein the relatively large connection between the piston chambers 11 and 33 and brake pipe 12 is controlled by a cut-off valve device 98 in turn controlled by the smaller slide valve 115. While in the drawings the two slide valves 62 and 115 are shown as being of substantially the same size it is to be understood that the drawings are merely diagrammatic and not intended to show the parts in proper relative sizes or as actually constructed.

The cut-off valve device 98 comprises two flexible diaphragms 99 and 100 arranged in spaced coaxial relation and clamped around their peripheral edges, the diaphragm 100 being of greater area than diaphragm 99 and cooperating therewith to form an intermediate chamber 101 which is open to the atmosphere through a passage 102. At the opposite side of diaphragm 99 is an annular seat rib 103 arranged for sealing engagement by the diaphragm 99. Within this seat rib is a chamber 104 to which passage 63 is connected, said passage in this embodiment not being connected to the valve chamber 62 as in the structure shown in Figs. 1 and 2. Encircling the seat rib 103 is an annular chamber 105 in constant communication with the brake pipe 12 and with the slide valve chamber 62 whereby the diaphragm 68 is constantly subject on its right-hand face to brake pipe pressure and thus capable of operation in the same manner as in the structure shown in Fig. 1.

A coil spring 106 disposed in chamber 101 is supported at one end on a wall in the casing while the opposite end engages a follower 107 bearing against the adjacent face of diaphragm 100. The follower 107 is connected by suitable struts 108 to a follower 109 engaging the adjacent face of diaphragm 99. The follower 107 is provided with a stud 110 which extends through the diaphragm 100 and a follower plate 111 mounted against the outer face of said diaphragm. A nut 112 provided on the end of stud 107 is tightened against the plate 111 thus securing the diaphragm 100 to the follower 107 and 109.

At the outer face of diaphragm 100 is a chamber 113 connected by a passage 114 to the seat of slide valve 115 contained in chamber 62. This slide valve embodies a cavity 116 arranged in the normal position of the valve and of diaphragm 68 to connect the passage 114 to an atmospheric passage 117 so as to normally open the diaphragm chamber 113 to atmosphere and allow spring 106 to hold diaphragm 100 in the position shown. Under this condition brake pipe pressure effective in chamber 105 on the diaphragm 99 will hold said diaphragm in the position shown disengaged from the seat rib 103, thus opening communication between brake pipe 12 and the service and emergency piston chambers 11 and 33 so that the "AB" valve may be controlled from the brake pipe in the usual manner.

When the slide valve 115 is moved manually to its brake release or right-hand position, a cavity 118 registers with the auxiliary reservoir passage 89 and with passage 114 and through this communication fluid under pressure will flow from the auxiliary reservoir to diaphragm chamber 113 and thereby deflect diaphragm 100 in the direction of the left-hand for urging the diaphragm 99 into sealing engagement with the seat rib 103 for thereby disconnecting the brake pipe from the piston chambers 10 and 33. In this brake release position of the slide valve 115 a port 119 therein registers with a passage 120 open to the brake pipe passage 63 and said port is connected through a choke 121 to the port 118 supplied with fluid from the auxiliary reservoir so that fluid from the auxiliary reservoir will flow to piston chambers 11 and 33 in the same manner and for the same purpose as above described, the choke 121 corresponding in this embodiment to choke 90 in the structure shown in Fig. 1

In this embodiment the blow down of the timing reservoir 78 will occur through cavity 116 in the slide valve and the atmospheric port 117 and the operation resulting therefrom may be identical to that obtained with the structure shown in Fig. 1 and above described.

When a car provided with this modified equipment is again cut into a train and the brake pipe 12 is recharged with fluid under pressure, such pressure effective in diaphragm chamber 62 on the right-hand face of the diaphragm 68 will return said diaphragm and the slide valve 115 to their normal position in the same manner as in the structure shown in Fig. 1. Upon return of the slide valve 115 to its normal position fluid under pressure in chamber 113 will be vented to the atmosphere by way of passage 114 and the atmospheric vent 117 and when the pressure of such fluid is reduced to a sufficient degree spring 116 will urge the diaphragm 100 back to its normal position to permit brake pipe pressure in chamber 105 to move the diaphragm 99 out of contact with seat rib 103. The brake pipe 12 will thereby be placed in communication with the piston chambers 11 and 33 so that the "AB" valve may then operate in the normal manner in response to variations in pressure in the brake pipe 12.

The release of fluid under pressure from diaphragm chamber 113 as just described may be retarded by a choke 125 in the atmospheric vent passage 114 in order to provide a gradual movement of the diaphragm 99 away from the seat rib 103 and thus a gradual opening of the communication between piston chambers 11 and 33 and the brake pipe so as to prevent a sudden reduction in pressure in said chambers and consequently undesired emergency operation of the emergency valve device. The choke 125 functions in this embodiment to accomplish the same result as obtained by the lead groove or opening 96 in slide valve 66 in the structure shown in Fig. 2 as will be apparent.

Summary

It will now be noted that if a car provided with a brake equipment embodying any one of the several embodiments of the invention is set out of a train and has its brake applied in emergency with the brake pipe on the car completely vented, a trainman from the side of the car may cause operation of the brake equipment to release the brakes on the car without loss of the stored fluid pressure in the reservoirs of the equipment. When the car is subsequently cut into a train the charging of the brake pipe on the car will automatically reset the mechanism to provide for usual operation of the brake equipment in response to variations in pressure in the brake pipe, and the release valve device will remain in this condition until subsequently manually operated.

In the structure shown in Fig. 1 a small release reservoir is added to the equipment for obtaining movement of the service application piston 10 to its brake release position, however, if desired this reservoir may be dispensed with and the emergency reservoir forming a part of the equipment may be employed for the same purpose, as illustrated in the structure shown in Fig. 2. The communication between the piston chambers of the "AB" valve and the brake pipe may be controlled directly by the release valve slide valve as shown in Figs. 1 and 2 or by a cutoff valve as shown in Fig. 4 in which case the slide valve functions merely as a pilot for the cut-off valve and may therefore be smaller in size than required in the other structures.

Having now described my invention, what I claim as new and desire to secure by Letters Patent, is:

1. In a fluid pressure brake, in combination, a brake pipe, a brake cylinder device, a storage reservoir for fluid under pressure, a brake controlling valve device normally connected to said brake pipe and operative upon opening said brake pipe to atmosphere to a brake application condition for opening communication between said reservoir and brake cylinder device and operable upon an increase in pressure in said brake pipe to a brake release condition for closing said communication and for opening said brake cylinder device to atmosphere, a release valve device interposed in and controlling communication between said brake pipe and brake controlling valve device and having a normal position for effecting opening of the last named communication, and having a second position for effecting closure of the last named communication and for also supplying fluid under pressure to said brake controlling valve device to effect brake release conditioning thereof, and means for controlling the positioning of said release valve device.

2. In a fluid pressure brake, in combination, a brake pipe, a brake cylinder device, a storage reservoir for fluid under pressure, a brake controlling valve device normally connected to said brake pipe and operative upon opening said brake pipe to atmosphere to a brake application condition for opening communication between said reservoir and brake cylinder device and operable upon an increase in pressure in said brake pipe to a brake release condition for closing said communication and for opening said brake cylinder device to atmosphere, a release valve device interposed in and controlling communication between said brake pipe and brake controlling valve device and having a normal position for effecting opening of the last named communication, and having a second position for effecting closure of the last named communication and for also supplying fluid under pressure to said brake controlling valve device to effect brake release conditioning thereof, means operable by fluid under pressure in said brake pipe to actuate said release valve device to said normal position, and means operable to actuate said release valve device to said second position with said brake pipe open to atmosphere.

3. In a fluid pressure brake, in combination, a brake pipe, a brake cylinder device, a storage reservoir for fluid under pressure, a brake controlling valve device normally connected to said brake pipe and operative upon opening said brake pipe to atmosphere to a brake application condition for opening communication between said reservoir and brake cylinder device and operable upon an increase in pressure in said brake pipe to a brake release condition for closing said communication and for opening said brake cylinder device to atmosphere, a release valve device interposed in and controlling communication between said brake pipe and brake controlling valve device and having a normal position for effecting opening of the last named communication, and having a second position for effecting closure of the last named communication and for also supplying fluid under pressure to said brake controlling valve device to effect brake release conditioning thereof, means operable manually with said brake pipe open to atmosphere to actuate said valve device to said second position, and means operable by fluid under pressure supplied to said brake pipe to actuate said valve device to said normal position.

4. In a fluid pressure brake, in combination, a brake pipe, a brake cylinder device, a storage reservoir for fluid under pressure, a brake controlling valve device operable upon a reduction in pressure in a passage to open communication between said reservoir and brake cylinder device to effect an application of brakes and operable upon an increase in pressure in said passage to close said communication and open said brake cylinder device to atmosphere to effect a release of brakes, a release valve device comprising a valve disposed to control communication between said passage and brake pipe and having an open position for rendering the pressure in said passage variable with pressure of fluid in said brake pipe and being movable from said open position to a second position for closing communication between said brake pipe and passage, means for controlling the positioning of said valve, and means operable to supply fluid under pressure to said passage upon movement of said valve to its closed position.

5. In combination with a fluid pressure brake system of the type comprising a brake pipe, a brake cylinder device, a storage reservoir for fluid under pressure, and a brake controlling valve device operable upon a reduction in pressure in a passage to open communication between said reservoir and brake cylinder device to effect an application of brakes and operable upon an increase in pressure in said passage to close said communication and open said brake cylinder device to atmosphere to effect a release of brakes, a second reservoir charged with fluid under pressure; a release valve device having a normal position opening said passage to said brake pipe to render the pressure in said passage variable with pressure in said brake pipe and being movable from said normal position to a second position for closing communication between said brake pipe and passage and for effecting opening of a communication between said passage and said second reservoir to render the pressure of fluid in said second reservoir effective to provide an increase in pressure in said passage to actuate said brake controlling valve device to close communication between said storage reservoir and brake cylinder device and to open said brake cylinder device to atmosphere, said release valve device in its normal position effecting closure of the communication between said second reservoir and said passage, and means operable upon charging of said brake pipe to move said release valve device to said normal position and operable manually with said brake pipe open to atmosphere to move said release valve device to said second position.

6. In combination with a fluid pressure brake system of the type comprising a brake pipe, a brake cylinder device, a storage reservoir for fluid under pressure, and a brake controlling valve device operable upon a reduction in pressure in a passage to open communication between said reservoir and brake cylinder device to effect an application of brakes and operable upon an increase in pressure in said passage to close said communication and open said brake cylinder device to atmosphere to effect a release of brakes; a second reservoir having a communication with said brake pipe providing for charging of said second reservoir with fluid at the maximum pressure in said brake pipe, valve means arranged to prevent flow of fluid under pressure from said second reservoir to said brake pipe reservoir upon a reduction in pressure in said brake pipe, a release valve device arranged to control communication between said passage and brake pipe, said release valve device having a normal position opening said passage to said brake pipe and effecting closure of a communication between said second reservoir and passage for rendering said brake controlling valve device responsive to variations in pressure in said brake pipe and being movable from said normal position to a second position for closing communication between said brake pipe and passage and for effecting opening of the communication between said second reservoir and passage to render the pressure of fluid in said second reservoir effective to effect said increase in pressure in said passage, and means operable by pressure of fluid supplied to said brake pipe to move said release valve device to said normal position and operable manually when said brake pipe is vented to move said release valve device to its second position.

7. In combination with a fluid pressure brake system of the type comprising a brake pipe, a brake cylinder device, a storage reservoir for fluid under pressure, and a brake controlling valve device comprising valve means controlled by opposing pressures of fluid in said reservoir and in a passage and operable upon a reduction in pressure in said passage to open a communication between said reservoir and brake cylinder device to provide for flow of fluid under pressure to said brake cylinder device to effect an application of brakes, said valve means being operable upon a certain increase in pressure in said passage above the opposing pressure in said reservoir to a brake release position for closing communication between said reservoir and brake cylinder device and for releasing fluid under pressure from said brake cylinder device to effect a release of brakes and being also operable in said release position to open communication between said passage and said reservoir to provide for flow of fluid under pressure from said passage to said reservoir to charge said reservoir; a release valve device arranged to control communication between said passage and brake pipe and having a normal position opening the last named communication to render the pressure in said passage variable with variations in pressure in said brake pipe and being movable from said normal position to a second position for closing communication between said brake pipe and passage and for opening said reservoir to said passage to provide an increase in pressure in said passage by flow of fluid under pressure from said reservoir, a second reservoir normally charged with fluid at the pressure normally carried in said brake pipe, means operable in said second position of said release valve device for opening communication between said second reservoir and passage to provide for substantial equalization of pressures therein, means operative to delay operation of the last named means until after substantial equalization of the pressures of fluid in said storage reservoir and passage to thereby render the pressure in said second reservoir effective to provide said certain increase in pressure in said passage over the opposing pressure in said storage reservoir, and means for controlling the positioning of said valve device.

8. In combination with a fluid pressure brake system of the type comprising a brake pipe, a brake cylinder device, a storage reservoir for fluid under pressure, and a brake controlling valve device comprising valve means controlled by opposing pressures in said reservoir and in a passage and operable upon a reduction in pressure in said passage to open a communication between said reservoir and brake cylinder device to provide for flow of fluid under pressure to said brake cylinder device to effect an application of brakes, said valve means being operable upon a certain increase in pressure in said passage above the opposing pressure in said reservoir to a brake release position for closing communication between said reservoir and brake cylinder device and for releasing fluid under pressure from said brake cylinder device to effect a release of brakes and being also operable in said release position to open communication between said passage and said reservoir to provide for flow of fluid under pressure from said passage to said reservoir to charge said reservoir; a release valve device arranged to control communication between said passage and brake pipe and having a normal position opening same to render the pressure in said passage variable with variations in pressure in said brake pipe and being movable from said normal position to a second position for closing communication between said brake pipe and passage and for opening said reservoir to said passage to provide an increase in pressure in said passage by flow of fluid under pressure from said reservoir, a second reservoir, means providing for flow of fluid under pressure from said brake pipe to said second reservoir for charging same to the normal pressure carried in said brake pipe and operable to prevent flow of fluid under pressure from said second reservoir to said brake pipe upon a reduction in brake pipe pressure, means operable in said second position of said release valve device for opening communication between said second reservoir and passage, and means controlling the last named means controlled by said release valve device and operable upon movement of said release valve device to said second position to delay opening of the communication between said second reservoir and passage for a period of time which provides for substantial equalization of pressures of fluid in said storage reservoir and passage to thereby render the pressure in said second reservoir effective to provide said certain increase in pressure in said passage over the opposing pressure in said storage reservoir, and means operable by fluid pressure supplied to said brake pipe for moving said release valve device to its normal position and operable manually with said brake pipe vented for moving said release valve device to its said second position.

9. In combination with a fluid pressure brake of the type comprising a brake pipe, a brake cylinder device, a storage reservoir for fluid under pressure, and a brake controlling valve device comprising valve means controlled by opposing pressures in said reservoir and in a passage and operable upon a reduction in pressure in said passage to open communication between said reservoir and brake cylinder device to provide for flow of fluid under pressure to said brake cylinder device to effect an application of brakes, said valve means being operable upon a certain increase in pressure in said passage above the opposing pressure in said reservoir to a brake release position for closing communication between said reservoir and brake cylinder device and for releasing fluid under pressure from said brake cylinder device to effect a release of brakes and being also operable in said release position to open communication between said passage and said reservoir to provide for flow of fluid under pressure from said passage to said reservoir to charge said reservoir; a second reservoir having a communication with said brake pipe providing for charging of said second reservoir with fluid at the normal pressure carried in said brake pipe, a check valve in the communication between said second reservoir and brake pipe arranged to prevent flow of fluid under pressure from said second reservoir to said brake pipe upon a reduction in brake pipe pressure, a slide valve having a normal position opening said passage to said brake pipe to render the pressure in said passage variable with variations in brake pipe pressure and being movable to a second position to effect closure of the communication between said passage and brake pipe and to establish communication between said storage reservoir and passage to provide for equalization of the pressures therein, a timing valve operable to open said second reservoir to said passage to provide for equalization of the pressures therein, means operable in said second position of said slide valve to delay operation of said timing valve until after substantial equalization of pressures in said storage reservoir and passage to thereby render the pressure of fluid in said second reservoir effective to provide said certain increase in pressure in said passage, a movable abutment connected to said slide valve and subject on one side to pressure of fluid in said brake pipe and on the opposite side to atmospheric pressure and operable by fluid under pressure supplied to said brake pipe to move said slide valve to its normal position, and means operable manually to move said slide valve to its second position.

10. In combination with a fluid pressure brake system of the type comprising a brake pipe, a brake cylinder device, a storage reservoir for fluid under pressure, and a brake controlling valve device comprising valve means controlled by opposing pressures in said reservoir and in a passage and operable upon a reduction in pressure in said passage to open communication between said reservoir and brake cylinder device to provide for flow of fluid under pressure to said brake cylinder device to effect an application of brakes, said valve means being operable upon a certain increase in pressure in said passage above the opposing pressure in said reservoir to a brake release position for closing communication between said reservoir and brake cylinder device and for releasing fluid under pressure from said brake cylinder device to effect a release of brakes and being also operable in said release position to open communication between said passage and said reservoir to provide for flow of fluid under pressure from said passage to said reservoir to charge said reservoir; a second reservoir, means including a one-way flow communication between said second reservoir and said brake pipe providing for charging of said second reservoir with fluid at the normal pressure carried in said brake pipe and arranged to prevent flow of fluid under pressure from said second reservoir to said brake pipe upon a reduction in brake pipe pressure, a slide valve having a normal position opening said passage to said brake pipe to render the pressure in said passage variable with variations in brake pipe pressure and being movable to a second position to effect closure of the communication between said passage and brake pipe and to establish communication between said storage reservoir and passage to provide for equalization of the pressures therein, a timing reservoir charged with fluid under pressure, a timing valve controlled by pressure of fluid in said timing reservoir and operable upon a reduction in such pressure to a certain degree to open said second reservoir to said passage to provide for equalization of the pressures therein, said slide valve in said second position opening communication between said storage reservoir and passage and opening said timing reservoir to atmosphere, means in the communication between said timing reservoir and atmosphere for regulating the reduction in pressure in said timing reservoir and operable to provide said certain pressure in said timing reservoir upon substantial equalization of pressures in said storage reservoir and passage to thereby render the pressure of fluid in said second reservoir effective to provide said certain increase in pressure in said passage, and means connected to said slide valve operable upon charging of said brake pipe to effect movement of said slide valve to its normal position and operable manually to effect movement of said slide valve to its second position with said brake pipe vented.

11. In combination with a fluid pressure brake system of the type comprising a brake pipe, a brake cylinder device, a storage reservoir for fluid under pressure, and a brake controlling valve device comprising valve means controlled by opposing pressures in said reservoir and in a passage and operable upon a reduction in pressure in said passage to open communication between said reservoir and brake cylinder device to provide for flow of fluid under pressure to said brake cylinder device to effect an application of brakes, said valve means being operable upon a certain increase in pressure in said passage above the opposing pressure in said reservoir to a brake release position for closing communication between said reservoir and brake cylinder device and for releasing fluid under pressure from said brake cylinder device to effect a release of brakes and being also operable in said release position to open communication between said passage and said reservoir to provide for flow of fluid under pressure from said passage to said reservoir to charge said reservoir; a release valve device controlling communication between said passage and brake pipe and having a normal position opening same to render the pressure in said passage variable with variations in pressure in said brake pipe and being movable from said normal position to a second position for closing communication between said brake pipe and passage and for opening said reservoir to said passage to provide an increase in pressure in said passage by flow of fluid under pressure from said reservoir, a second reservoir normally charged with fluid at the pressure normally carried in said brake pipe, means operable in said second position of said release valve device for opening communication between said second reservoir and passage to provide for substantial equalization of pressures therein, means operative to delay operation of the last named means until after substantial equalization of the pressures of fluid in said storage reservoir and passage, means in the communication opened between said storage reservoir and passage operative to render the pressure of fluid supplied to said passage from said second reservoir effective to provide said certain increase in pressure in said passage over the opposing pressure of fluid in said storage reservoir, and means for controlling the positioning of said valve device.

12. In combination with a fluid pressure brake system of the type comprising a brake pipe, a brake cylinder device, a storage reservoir for fluid under pressure, and a brake controlling valve device comprising valve means controlled by the opposing pressures in said reservoir and in a passage and operable upon a reduction in pressure in said passage to open a communication between said reservoir and brake cylinder device to provide for flow of fluid under pressure to said brake cylinder device to effect an application of brakes, said valve means being operable upon a certain increase in pressure in said passage above the opposing pressure in said reservoir to a brake release position for closing communication between said reservoir and brake cylinder device and for releasing fluid under pressure from said brake cylinder device to effect a release of brakes and being also operable in said release position to open communication between said passage and said reservoir to provide for flow of fluid under pressure from said passage to said reservoir to charge said reservoir; a release valve device controlling communication between said passage and brake pipe and having a normal position opening same to render the pressure in said passage variable with variations in pressure in said brake pipe and being movable from said normal position to a second position for closing communication between said brake pipe and passage and for opening said reservoir to said passage to provide an increase in pressure in said passage by flow of fluid under pressure from said reservoir, a second reservoir normally charged with fluid at the pressure normally carried in said brake pipe, means operable in said second position of said release valve device for opening communication between said second reservoir and passage to provide for substantial equalization of pressures therein, means operative to delay the operation of the last named means until after substantial equalization of the pressures of fluid in said storage reservoir and passage, a choke in the communication opened between said storage reservoir and passage operative to limit dissipation of fluid from said passage to said storage reservoir upon supply of fluid to said passage from said second reservoir to thereby render the fluid pressure supplied from said second reservoir to said passage effective to provide said certain increase in pressure in said passage over the opposing pressure of fluid in said storage reservoir, and means for controlling the positioning of said valve device.

13. In combination with a fluid pressure brake system of the type comprising a brake pipe, a brake cylinder device, an auxiliary reservoir, and a brake controlling valve device comprising valve means controlled by the opposing pressures of fluid in said reservoir and in a passage and operable upon a reduction in pressure in said passage to open a communication between said auxiliary reservoir and said brake cylinder device to provide for flow of fluid under pressure to said brake cylinder device to effect an application of brakes, said valve means being operable upon a certain increase in pressure in said passage above the opposing pressure of fluid in said auxiliary reservoir to close communication between said reservoir and brake cylinder device and to open said brake cylinder device to atmosphere; a second reservoir normally charged with fluid at the pressure normally carried in said brake pipe, a cut-off valve controlling communication between said passage and brake pipe, and a release valve device having a normal position for effecting operation of said cut-off valve to open the communication controlled thereby and movable to a second position to effect operation of said cut-off valve to close the communication controlled thereby and also to supply fluid under pressure from said second reservoir to said passage to provide said certain increase in pressure in said passage, and means controlling the position of said release valve device.

14. In combination with a fluid pressure brake system of the type comprising a brake pipe, a brake cylinder device, an auxiliary reservoir, and a brake controlling valve device comprising valve means controlled by the opposing pressure in said reservoir and in a passage and operable upon a reduction in pressure in said passage to open communication between said auxiliary reservoir and said brake cylinder device to provide for flow of fluid under pressure to said brake cylinder device to effect an application of brakes, said valve means being operable upon a certain increase in pressure in said passage above the opposing pressure of fluid in said auxiliary reservoir to a brake release position for closing communication between said reservoir and brake cylinder device and for opening said brake cylinder device to atmosphere; a second reservoir, a one way flow communication between said second reservoir and said brake pipe through which fluid under pressure is arranged to be supplied from said brake pipe for charging said second reservoir to the maximum degree normally carried in said brake pipe, a cut-off valve controlling communication between said passage and brake pipe, a release valve device controlling said cut-off valve and having a normal position for effecting operation of said cut-off valve to open communication between said passage and brake pipe and having a second position for effecting operation of said cut-off valve to close communication between said passage and brake pipe, said release valve device in said second position establishing communication between said auxiliary reservoir and passage to provide for substantial equalization of pressures therein and being also operable in said second position to effect opening of said second reservoir to said passage to provide for equalization of pressures therein, and means controlled by said release valve device operable in the second position thereof to delay opening of said second reservoir to said passage until after substantial equalization of pressure in said auxiliary reservoir and passage, said release valve device comprising means operable by fluid pressure supplied to said brake pipe to move said release valve device to its normal position and operable manually when said brake pipe is vented to move said release valve device to its said second position.

15. In combination with a fluid pressure brake system of the type comprising a brake pipe, a storage reservoir for fluid under pressure, and a brake controlling valve device comprising valve means controlled by opposing pressures of fluid in said reservoir and in a passage and operable upon a certain rate of reduction in pressure in said passage to a brake application position; valve means controlling a primary communication between said passage and brake pipe and having a closed position for effecting closure of said communication, and being movable to an open position to effect opening of said communication, to render the pressure in said passage variable with that in said brake pipe, and means associated with said valve means operable upon movement thereof from said closed position to said open position to open a secondary communication between said passage and brake pipe ahead of opening said primary communication, said secondary communication being of a size to permit a reduction in pressure in said passage, by flow to said brake pipe when said brake pipe is charged with fluid at a lower pressure than in said passage at a rate less than said certain rate, and means for positioning said valve means.

16. In combination with a fluid pressure brake system of the type comprising a brake pipe, a brake controlling valve device comprising valve means controlled by the opposing pressures of fluid in a chamber and in a passage and operable upon a certain rate of reduction in pressure in said passage to effect a corresponding rate of reduction in pressure in said chamber and upon a faster rate of reduction in pressure in said passage to effect an application of brakes; valve means controlling a primary communication between said passage and brake pipe and having a closed position for effecting closure of said communication, and being movable to an open position to effect opening of said communication to render the pressure in said passage variable with the pressure in said brake pipe, and means associated with said valve means and operable upon movement thereof from said closed position to said open position to effect opening of a secondary communication between said brake pipe and passage ahead of opening said primary communication, said secondary communication being of a size to limit the reduction in pressure in said passage by flow to said brake pipe, when the pressure of fluid in said brake pipe is of a lower degree than in said passage, to a rate less than said certain rate.

17. In combination with a fluid pressure brake system of the type comprising a brake pipe, and a brake controlling valve device having a passage normally open to said brake pipe and operable upon a reduction in pressure in said brake pipe and thereby in said passage at a rate not less than a certain rate to effect an application of brakes; valve means controlling a first communication between said passage and brake pipe and having a closed position for effecting closure of said communication and being movable to an open position to effect opening of said communication, and means associated with said valve means operable upon movement of said valve means from said closed position to said open position to effect opening of a second communication between said passage and brake pipe ahead of opening said first communication, said second communication being of such size as to provide for a reduction in pressure in said passage into said brake pipe, when the pressure in said brake pipe is lower than in said passage, at a rate less than said certain rate.

18. In combination with a fluid pressure brake system of the type comprising a brake pipe, a brake controlling valve device comprising service application means operable upon either a service or an emergency rate of reduction in pressure in a passage normally open to said brake pipe to supply fluid under pressure to effect an application of brakes, emergency application means subject normally to the opposing pressures of fluid in said brake pipe and in a valve chamber and operable by the pressure of fluid in said valve chamber upon an emergency rate of reduction in pressure in said passage to supply fluid under pressure to effect an application of brakes, and means operable upon a service rate of reduction in pressure in said passage to reduce the pressure in said valve chamber at a corresponding rate to render said emergency application means non-operable to supply fluid under pressure for effecting an application of brakes; valve means controlling two communications between said passage and brake pipe and having a closed position for closing both of said communications and being operable upon movement from said closed position to an open position to open first one of said two communications and then the other of said two communications, said one communication having a flow capacity arranged to limit the reduction in pressure in said passage into said brake pipe when the pressure in said brake pipe is below that in said passage, to a rate less than said emergency rate, and the other communication having greater flow to provide for the pressure in said passage varying with variations in pressure in said brake pipe.

19. In combination with a fluid pressure brake system of the type comprising a brake pipe, a brake cylinder device, an auxiliary reservoir, an emergency reservoir, and a brake controlling valve device comprising service application means operable upon an emergency rate of reduction in pressure in a passage to open communication between said auxiliary reservoir and brake cylinder device, and emergency application means operable upon an emergency rate of reduction in pressure in said passage to open communication between said emergency reservoir and brake cylinder device, the equalization of pressures in said reservoirs into said brake cylinder device providing for operation thereof to effect an emergency application of brakes, said service and emergency application means each being operable upon an increase in pressure in said passage to close communication between the respective reservoirs and said brake cylinder device and said service application means being also operable upon closing communication between said auxiliary reservoir and brake cylinder device to open said brake cylinder device to atmosphere; release valve means controlling communication between said passage and brake pipe and operable by fluid under pressure supplied to said brake pipe to open said communication to render the pressure in said passage variable with that in said brake pipe to provide for control of said application means from said brake pipe, means operable manually when said brake pipe is open to atmosphere to condition said release valve means to close communication between said passage and brake pipe, and means including said release valve means operable upon closing communication between said passage and brake pipe for supplying fluid under pressure to said passage to provide said increase in pressure therein.

20. In combination with a fluid pressure brake system of the type comprising a brake pipe, a brake cylinder device, an auxiliary reservoir, an emergency reservoir, and a brake controlling valve device comprising service application means controlled by opposing pressures of fluid in said auxiliary reservoir and in a passage and operable upon an emergency rate of reduction in pressure in said passage to a position for opening communication between said auxiliary reservoir and brake cylinder device and operative upon an increase in pressure in said passage to a degree exceeding the auxiliary reservoir pressure to a release position for closing communication between said auxiliary reservoir and brake cylinder device and for opening said brake cylinder device to atmosphere, said brake controlling valve device further comprising emergency application means operative upon an emergency rate of reduction in pressure in said passage to open communication between said emergency reservoir and brake cylinder device and operative upon a certain increase in pressure in said passage to close such communication; a release valve controlling communication between said passage and brake pipe and movable to a normal position by pressure of fluid in said brake pipe for opening the last named communication to render the pressure in said passage variable with that in said brake pipe, said release valve being movable to a second position when said brake pipe is open to the atmosphere for closing communication between said passage and brake pipe and for opening communication between said auxiliary reservoir and passage to provide said certain increase in pressure in said passage, a third reservoir having a one-way flow communication with said brake pipe for charging said third reservoir with fluid at the normal pressure carried in said brake pipe, timing means operative to connect said third reservoir to said passage, and means including said release valve operative in the position thereof closing communication between said passage and brake pipe to effect operation of said timing means upon substantial equalization of pressures in said auxiliary reservoir and passage to thereby provide an increase in pressure in said passage to the said degree above the auxiliary reservoir pressure for effecting movement of said service application means to said release position.

21. In combination with a fluid pressure brake of the type comprising a brake pipe, a brake cylinder device, an auxiliary reservoir, an emergency reservoir, and a brake controlling valve device comprising service application means controlled by opposing pressures of fluid in a passage normally open to said brake pipe and in said auxiliary reservoir and movable upon an emergency rate of reduction in pressure in said brake pipe and thereby in said passage to an application position for opening communication between said auxiliary reservoir and brake cylinder device, said service application means being movable upon an increase in pressure in said passage to a degree exceeding the opposing auxiliary reservoir pressure from said application position to a release position for closing communication between said auxiliary reservoir and brake cylinder device and for opening said brake cylinder device to atmosphere, said brake controlling valve device further comprising emergency application means controlled by the opposing pressures in said passage and in a chamber and being movable to an application position upon an emergency rate of reduction in brake pipe pressure for opening communication between said emergency reservoir and brake cylinder device and for opening said chamber to the atmosphere, said emergency application means being movable upon a certain increase in pressure in said passage over opposing atmospheric pressure in said chamber from said application position to another position for closing communication between said emergency reservoir and brake cylinder device, the pressure of fluid in both of said reservoirs with both pistons in their application positions equalizing into said brake cylinder device for effecting an emergency application of brakes; a release valve controlling communication between said passage and brake pipe and having a normal position for opening the last named communication and another position for closing the last named communication, means operative by brake pipe pressure for moving said release valve to its normal position, manually operable means operative with said brake pipe open to the atmosphere for moving said release valve to its other position, said release valve in its said other position opening communication between said auxiliary reservoir and passage to provide said certain increase in pressure in said passage for controlling said emergency application means and also substantial equalization of the said opposing fluid pressures for controlling said service application means and which reduces the pressure in said auxiliary reservoir to a degree below that in said emergency reservoir, said release valve in its said other position also effecting opening of said emergency reservoir to said passage, and means associated with said release valve operative to provide for the pressure of fluid supplied from said emergency reservoir to said passage to increase the pressure in said passage to the said degree exceeding auxiliary reservoir pressure.

22. In combination with a fluid pressure brake system of the type comprising a brake pipe, a brake cylinder device, an auxiliary reservoir, an emergency reservoir, and a brake controlling valve device comprising service application means controlled by opposing pressures of fluid in the auxiliary reservoir and in a passage open to said brake pipe and operative upon an increase in brake pipe pressure to a chosen degree exceeding the pressure in said auxiliary reservoir to a brake release position for opening said brake cylinder device to atmosphere and for supplying fluid under pressure to said auxiliary and emergency reservoirs for charging same, said service application means being operative upon an emergency rate of reduction in pressure in said brake pipe and thereby in said passage to a brake application position for closing communication between said reservoirs and for opening communication between said auxiliary reservoir and said brake cylinder device, emergency application means controlled by the opposing pressures of fluid in said passage and a chamber and operative upon an emergency rate of reduction in brake pipe pressure in said passage to an emergency position for opening communication between said emergency reservoir and brake cylinder device and for opening said chamber to atmosphere, said emergency application means being operative upon a relatively small increase in brake pipe pressure in said passage over opposing atmospheric pressure in said chamber to a normal position for closing communication between said emergency reservoir and brake cylinder device and being movable upon a greater increase in pressure in said passage over the opposing pressure past said normal position to a back-dump position for establishing communication between said brake cylinder device and passage to provide for flow of fluid under pressure from said brake cylinder device and thus said auxiliary reservoir, which is connected to said brake cylinder device with said service piston in application position, to said passage; a release valve controlling communication between said passage and brake pipe and having a normal position opening the last named communication and a second position for closing the last named communication, a movable abutment operable upon charging said brake pipe with fluid under pressure to move said release valve to said normal position, means operable manually with said brake pipe open to atmosphere to move said release valve to its second position, said release valve in its second position opening communication for supplying fluid under pressure from said auxiliary reservoir to said passage to provide the said relatively small increase in pressure in said passage, a timing valve controlling communication between said emergency reservoir and said passage, and means controlled by said release valve and operative in the second position thereof to effect operation of said timing valve to open the communication controlled thereby upon substantial equalization of the pressures of fluid in said brake cylinder device and auxiliary reservoir into said passage for thereby rendering the pressure of fluid in said emergency reservoir effective to increase the pressure of fluid in said passage to the said chosen degree in excess of pressure of fluid in said auxiliary reservoir.

23. In combination with a fluid pressure brake system of the type comprising a brake pipe, a brake cylinder device, an auxiliary reservoir, an emergency reservoir, a brake controlling valve device comprising a service application means controlled by opposing pressures of fluid in the auxiliary reservoir and in a passage open to said brake pipe and operative upon an increase in brake pipe pressure to a brake release position for opening said brake cylinder device to atmosphere and for supplying fluid under pressure to said auxiliary and emergency reservoirs for charging same, said service application means being operative upon an emergency rate of reduction in pressure in said brake pipe and thereby in said passage to a brake application position for closing communication between said reservoirs and for opening communication between said auxiliary reservoir and said brake cylinder device, and emergency application means controlled by opposing pressures of fluid in said passage and in a chamber and operative upon an emergency rate of reduction in brake pipe pressure in said passage to an emergency position for opening communication between said emergency reservoir and brake cylinder device and for opening said chamber to atmosphere, said emergency piston being operative upon a relatively small increase in brake pipe pressure over opposing atmospheric pressure in said chamber to a normal position for closing communication between said emergency reservoir and brake cylinder device and being movable upon a greater increase in pressure in said passage past said normal position to a back-dump position for establishing communication between said brake cylinder device and passage to provide for flow of fluid under pressure from said brake cylinder device and thus said auxiliary reservoir which is connected to said brake cylinder device with said service application means in application position; to said passage, a release valve controlling communication between said passage and brake pipe and having a normal position opening such communication and a second position for closing such communication, a movable abutment operable upon charging said brake pipe with fluid under pressure to move said release valve to said normal position, means operable manually with said brake pipe open to atmosphere to move said release valve to its second position, said release valve in its second position opening communication for supplying fluid under pressure from said auxiliary reservoir to said passage to thereby provide the increase in pressure on said emergency piston for moving same to said back-dump position, a release reservoir having a one-way flow communication with said brake pipe for charging said reservoir with fluid at the pressure normally carried in said brake pipe, a timing reservoir having a one-way flow communication with said brake pipe for charging same with fluid at the pressure normally carried in said brake pipe, a timing valve controlling communication between said release reservoir and passage and controlled by pressure of fluid in said timing reservoir, said timing valve being operative to close the communication controlled thereby when the pressure of fluid in said timing reservoir is above a certain degree and to open such communication when less than said certain degree, and means including said release valve operable in the said second position thereof to effect a reduction in pressure in said timing reservoir to below said certain degree subsequent to substantial equalization of pressures of fluid in said auxiliary reservoir and brake cylinder device into said passage, to thereby render pressure of fluid in said release reservoir effective to increase the pressure in said passage to the degree required to move said service application means to its brake release position.

CARLTON D. STEWART.